April 3, 1956
O. J. WESA
2,740,503
BRAKE DRUM COOLING
Filed March 10, 1953
2 Sheets-Sheet 1
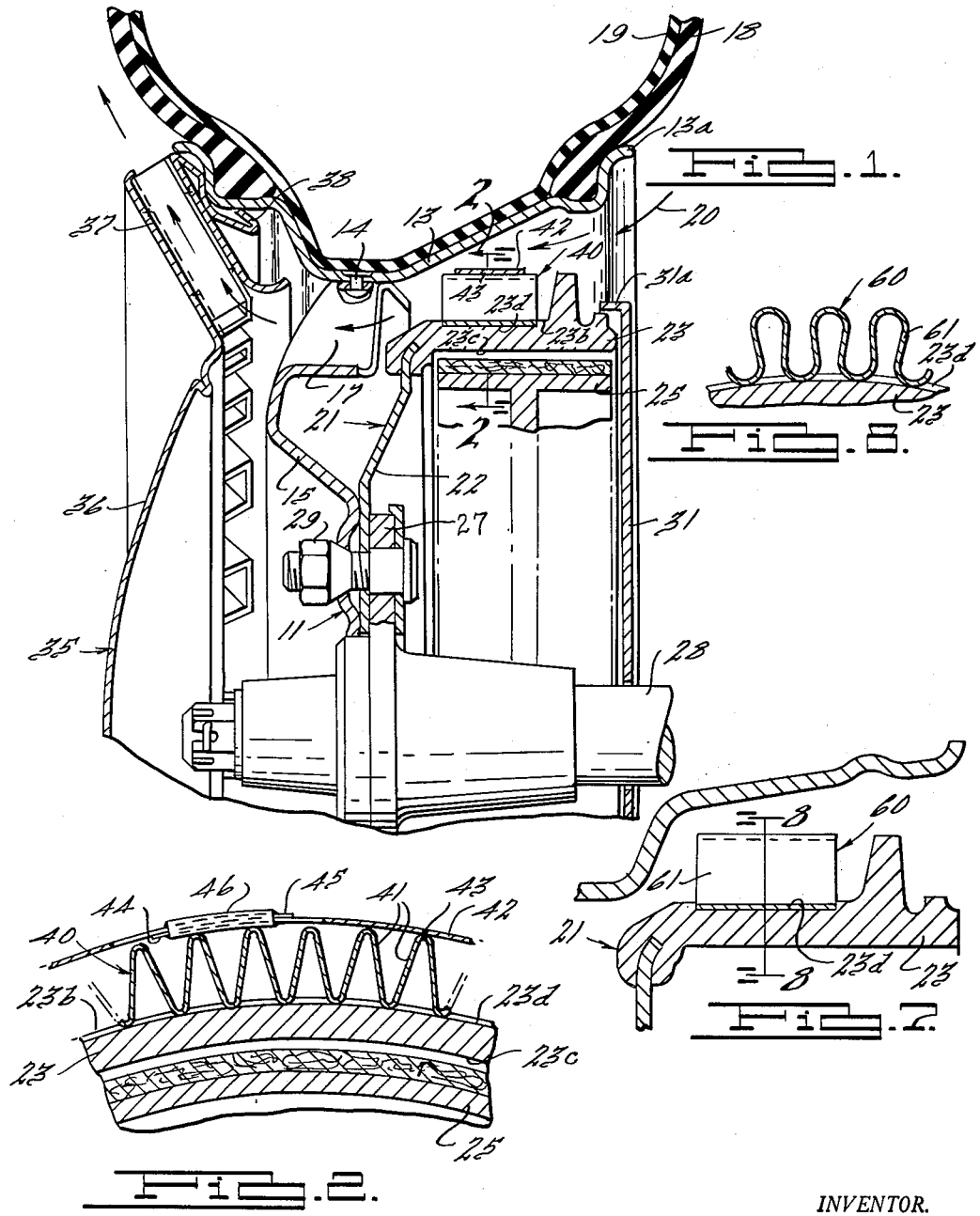
INVENTOR.
Oscar J. Wesa.
BY
Harness and Harris
ATTORNEYS.

April 3, 1956  O. J. WESA  2,740,503
BRAKE DRUM COOLING
Filed March 10, 1953  2 Sheets-Sheet 2
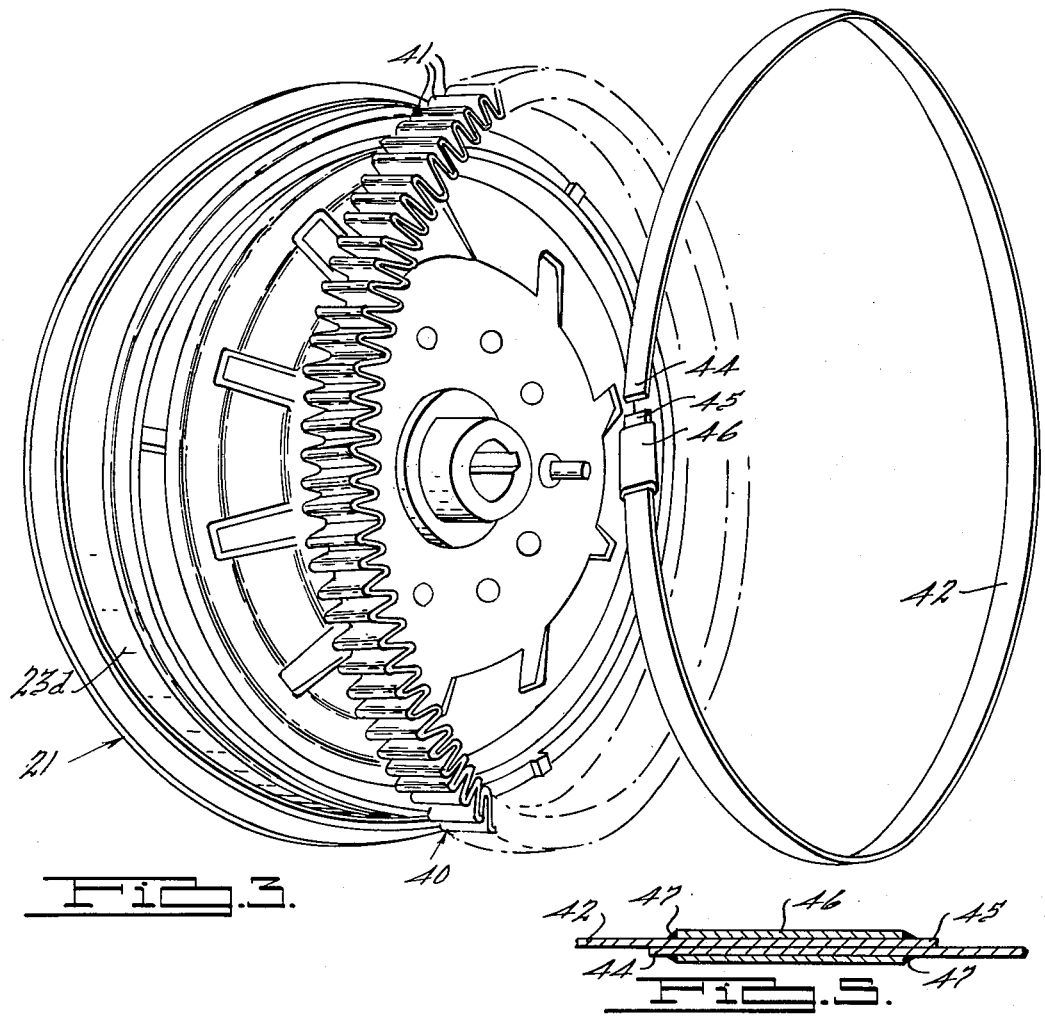
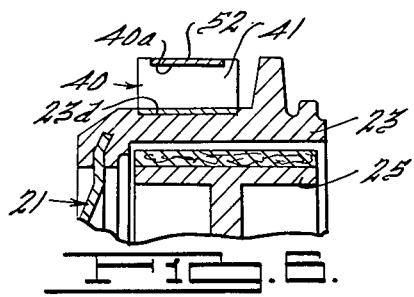
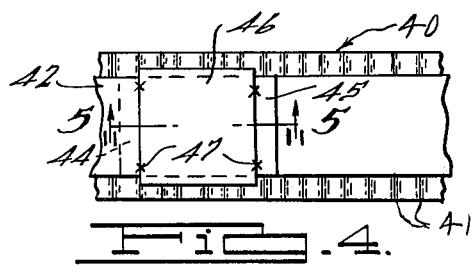
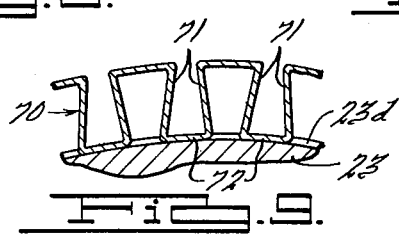
INVENTOR.
Oscar J. Wesa.
BY
Harness and Harris
ATTORNEYS.

United States Patent Office 2,740,503
Patented Apr. 3, 1956

2,740,503

BRAKE DRUM COOLING

Oscar J. Wesa, Detroit, Mich., assignor to Chrysler Corporation, Highland Park, Mich., a corporation of Delaware Application March 19, 1953, Serial No. 341,433

5 Claims. (Cl. 188—264)

This invention relates to devices for readily dissipating the heat from a rotatable brake drum or the like. This invention is an improvement over the copending, commonly owned application of Ferman P. Martin, Serial No. 256,873, filed November 17, 1951.

It is a primary object of this invention to provide a simple, economical, brake drum heat dissipating structure that may be readily incorporated in any conventional brake drum structure so as to provide improved brake operation.

It is a further object of this invention to provide a finned ring that may be mounted about the periphery of a brake drum to readily dissipate the heat therefrom and to further serve as a vibration damping device to reduce and/or eliminate various types of braking noise.

It is still another object of this invention to provide a brake drum heat dissipating structure that comprises a drum encircling finned ring formed from a corrugated strip of heat conducting material that may be readily connected to the drum periphery.

It is still another object of this invention to provide a brake drum heat dissipating structure that comprises a finned ring of heat dissipating material that has associated therewith an encircling anchor band to effect its attachment to the periphery of a brake drum.

It is still another object of this invention to provide a brake drum heat dissipating structure comprising a drum encircling finned ring of corrugated strip-like material that may be directly connected to the periphery of a brake drum and retained thereon by resilient tension in the corrugated strip.

It is a further object of this invention to mount a corrugated ring of fins on the periphery of a brake drum by means of resiliently snapping the ring into a preformed recessed seat.

Other objects and advantages of this invention will become readily apparent from a reading of the folowing description and a consideration of the related drawings wherein:

Fig. 1 is a fragmentary transverse sectional elevational view of a portion of a vehicle wheel and brake assembly that embodies one form of this invention;

Fig. 2 is an enlarged fragmentary sectional elevational view of the brake drum cooling fin structure shown in Fig. 1, the view being taken along the line 2—2 of Fig. 1;

Fig. 3 is an exploded perspective view of the brake drum, the heat dissipating finned ring and the ring anchoring band shown in Fig. 1, the drum, ring and band being shown prior to mounting of the ring and band on the drum;

Fig. 4 is a fragmentary enlarged plan elevational view of the overlapped ends of the anchoring band shown in Figs. 1–3;

Fig. 5 is an elevational view of the overlapped ends of the anchor band, the view being taken along the line 5—5 of Fig. 4;

Fig. 6 is a fragmentary sectional elevational view of a modified form of brake drum cooling finned ring;

Fig. 7 is an enlarged fragmentary sectional elevational view of a modified form of brake drum cooling finned ring;

Fig. 8 is a sectional elevational view of the form of the invention shown in Figs. 7, the view being taken along the line 8—8 of Fig. 7; and Fig. 9 is a fragmentary sectional elevational view of another modified form of brake drum cooling finned ring.

As a result of the general desire to improve the visual appearance of the current motor vehicle, it has become quite prevalent to provide motor vehicle wheels with decorative wheel covers. These covers tend to substantially close off the axially directed circulation of air through the wheels and across the associated wheel brake drums and braking mechanisms. Current body styling also tends to conceal the wheels and the brake drums from view and to prevent the free flow of cooling air around the brake drums. At the same time vehicle weights and speeds have increased without an equivalent increase in the size of the associated brake drums consequently more heat is being generated in the drums during braking action while less efficient forms of heat dissipating devices are provided for the drums. This invention comprises a brake drum encircling finned ring that provides a most economical, efficient form of brake drum heat dissipating device. The disclosed drum cooling means is so constructed and arranged that a maximum cooling effect is achieved and at the same time noise vibrations are damped so as to provide a quiet brake mechanism.

In the drawings the numeral 11 represents a conventional wheel unit formed from an annular rim 13 connected by rivets 14 to a disc-like wheel web portion 15. The periphery of the web portion 15 is formed with a plurality of substantially semi-circular, radially indented, openings 17 that provide air circulation channels through the wheel web portion 15. The purpose of the openings 17 will become readily apparent from the subsequent description. A tire casing 18, provided with an inflatable tube element 19, is mounted on the rim 13 in conventional manner.

Mounted on the rear or inner side of the wheel web portion 15 is a brake drum 21. The brake drum shown in Fig. 1 is of cup-like design and it may be of stamped or a composite design such as shown in Fig. 1. Brake drum 21 includes the dished, plate-like support portion 22 from which there projects the annular peripheral flange portion 23. Portion 23 provides the braking area which is adapted to be engaged by the movable brake shoes 25. Drum flange portion 23 is formed along its inner side with a brake shoe engaging surface 23c composed of some wear resistant, rigid, ferrous material such as cast iron or steel. The outwardly exposed surface portion 23b of the brake drum flange 23 is surrounded by a corrugated ring 40 that provides a plurality of cooling fins 41. The ring assembly 40 is subsequently described in detail. The fins 41 of the ring 40 are adapted to quickly dissipate the heat generated within the brake drum during application of the shoes 25 to the drum interior portion 23c during braking operations.

The wheel unit web portion 15 and the plate portion 22 of brake drum 21 are secured to the radial extending flange portion 27 of the wheel axle 28 by the bolt and nut connecting means 29. A dust cover 31 extends across the inner open side of the brake drum 21 so as to provide a means for preventing foreign matter from entering the chamber within brake drum 21. It will be noted that the area between the periphery 31a of the dust cover 31 and the inner edge 13a of the wheel rim portion 13 is open to provide an entrance through which axially moving air on the inner side of the wheel may readily pass to reach the openings 17 in the wheel web portion 15. Air passing through this entrance area is drawn across the cooling fins 41 on the brake drum 21 and this dissipates the heat on the fins and cools the brake drum. The many advantages secured by the ready dissipation of the heat of the brake drum, which heat is generated during braking, will not be enumerated now for it is thought that these advantages are well known in the art.

To improve the circulation of air across the portion of the brake drum that contains the set of cooling fins 41, there is provided a centrifugal fan element 37 that is an integral part of the decorative wheel cover unit 35. Fan 37 causes an axially directed flow of cooling air across the fins 41 on wheel rotation as indicated by the arrows 20 in Fig. 1. Wheel cover unit 35 is adapted to be detachably mounted on the outer or normally exposed side of the wheel unit 11 by spring clip means or the like. Wheel cover 35 is composed of three principal elements, an outer cover plate or disc 36, an annular corrugated fan element 37 and a cover retaining ring 38. These three elements of the wheel cover are assembled as an integral unit so that the wheel cover unit may be quickly and easily applied to any conventional motor vehicle wheel assembly. This specific cover 35 forms no part of this invention as it is covered by the copending application of John P. Butterfield, Serial No. 103,780, filed July 9, 1949, and now U. S. Patent No. 2,633,944, issued April 7, 1953.

In the form of the invention shown in Figs. 1–5 the brake drum flange 23 is a casting which may be of some ferrous material such as cast iron or steel. The outer surface 23b of the drum flange 23 is machined to provide a depressed seat 23d for the reception of the fin ring 40. The normal inside diameter of the corrugated elastic ring 40 is slightly less than the outside diameter of the brake drum 21 measured between diametrically opposed portions of the ring seat 23d. The reason for this specified relationship is that it has been found advantageous to mount the ring 40 on the drum 21 by elastically expanding the ring 40 about the outer periphery 23b of the drum flange 23 and permitting the expanded ring 40 to snap into the recessed seat groove 23d in the outer peripheral surface of drum flange 23. This anchors the ring 40 against axial movement.

After elastically snapping the ring 40 about the brake drum flange 23, then the anchor band 42 is wrapped about the outer periphery of the corrugated ring 40 and the overlapped ends 44, 45 of the anchor band 42 are engaged in the locking clip 46. Band 42 is tacked, by several circumferentially spaced welds or the like 43, to the outer periphery of the corrugated ring 40. The overlapped ends 44, 45 of the ring anchor band 42, that are enclosed in the sleeve-type clip 46, may be connected to the sleeve-type clip 46 by crimping or by tack welding such as is shown at 47. Band 42 thus anchors the finned ring 40 in its seat 23d and prevents the ring 40 from being disengaged therefrom as a result of centrifugal action. It will be noted that anchor band 42 is of less width than the finned ring 40 and thus cooling air at the inner periphery of the ring 40 may be centrifuged outwardly without being completely blocked by the encircling anchor band 42.

The band 42 and the corrugated fins 41 are both good thermal conductors and the corrugated fins 41 provide a large surface area for heat dissipation. It is thought to be evident that the elastic shrink fit of the ring 40 to the machined seat 23d on drum flange 23 gives a good thermal connection that will readily transfer heat from the drum 21 to the ring fins 41 and the band 42. It has been found that a relatively high rate of brake drum cooling can be obtained with brake drums equipped with this very simple form of finned ring construction and as a result improved braking may be achieved.

It has also been found that the corrugated fin ring 40 provides a dual function in that it serves as vibration damping device that damps out noise in the associated brake. It has been common in the brake field to stretch a coil spring around the periphery of a brake drum to damp out certain types of brake noise. However, such prior damping springs have never been designed to effectively dissipate drum heat. In the constructions herein disclosed the corrugated fin ring 40 permits the elimination of the coil type vibration damping spring and thus a cost savings is realized in addition to improved brake performance due to drum cooling.

Fig. 6 shows a modification of the invention shown in Figs. 1–5. In this form the outer peripheral portions of the corrugated fin ring 40 have a depressed seat 40a formed therein to provide an adequate recess to receive the ring encircling anchor band 52. Band 52 may have overlapped end portions connected by suitable clip means such as the clip means 46 shown in Figs. 2–5 or, in the alternative the ends of band 52 may be joined by a butt weld connection or any other type of similar connection. As was the case with the Fig. 1–5 form of the invention, the width of anchor band 52 is less than the width of the finned ring 40.

Figs. 7 and 8 show another modified form of this invention. In this form of the invention the brake drum flange 23 includes the recessed seat 23d around its outer peripheral surface that is adapted to receive the encircling finned drum cooling ring 60. Ring 60 is similar to ring 40 but the fins 61 of ring 60 are of S-shape configuration or what is often referred to as sinuously bent formations. The ring 60 normally has an inside diameter that is considerably less than the diameter of the brake drum flange 23. The resilient, band type, ring 60 is expanded and snapped over the drum flange 23 so that it will seat in the drum flange recessed seat 23d. The tension in the strip 60 retains it in position and opposes any centrifugal forces that might tend to release the ring 60 from the drum flange 23. Seat 23d of flange 23 prevents axial movement of the ring 60 relative to flange 23. This form of the invention completely eliminates the use of the anchor band 42 or any similar type of anchor means and relies on the tension in the expanded resilient band 60 to retain the band in assembled position. This is obviously a very simple, inexpensive brake drum cooling device.

Fig. 9 shows another type of finned, band-type, brake drum cooling ring. In this form the corrugations of the band are shaped so as to place a large surface portion of the cooling ring in surface contact with the outer peripheral surface 23d of the brake drum flange 23. The finned ring 70 has the fins 71 thereof formed to provide keystone-shaped wedge sections that are connected at their inner ends by circumferentially extending strip sections 72. Strip sections 72 are adapted to be mounted flush against the outer peripheral surface 23d of the brake drum flange 23 so that the surface contact therebetween will provide for maximum heat transfer and heat dissipation. The form of finned ring 70 shown in Fig. 9 differs from the forms of rings shown in Figs. 1–8 in that the finned ring 70 has large surface areas in contact with the drum periphery 23d whereas the other forms of finned rings 40, 60 have essentially line contact with the brake drum exterior surface 23d. The finned ring 70 can be anchored to the outer periphery of the drum 23 by any of the several means hereinbefore disclosed.

I claim:

1. A brake drum heat dissipating unit comprising an annular ring of corrugated, strip-like, heat conducting material adapted to encircle and seat upon the outer periphery of a brake drum, the ring corrugations providing radially projecting fin elements that extend transversely of the brake drum on which the ring is to be mounted, and an annular band of heat conducting material encircling the outer periphery of said ring and connected to certain of the fins thereof, said band extending across a portion of the ring width and having the ends thereof overlapped and connected by a sleeve-type clip.

2. In combination, an annular brake drum having a substantially axially extending peripheral flange with a circumferentially extending recess in the outer peripheral surface thereof, a ring of corrugated, strip-like, heat conducting material formed to provide a plurality of radially extending fins encircling said flange and seated in said recess in face-to-face relationship therewith, and a band of material encircling the outer periphery of said corrugated ring and fixed thereto so as to cover only a portion of the ring width.

3. In combination, an annular brake drum having a substantially axially extending peripheral flange with a circumferentially extending recess in the outer peripheral surface thereof, a ring of corrugated, strip-like, heat conducting material formed to provide a plurality of radially extending fins encircling said flange and seated in said recess in face-to-face relationship therewith, and a band of material encircling the outer periphery of said corrugated ring and fixed thereto, said band being of less width than the ring and having overlapped ends that are connected together by a sleeve-type clip.

4. In combination, an annular brake drum having a substantially axially extending peripheral flange with a circumferentially extending recess in the outer peripheral surface thereof, an annular corrugated strip of heat conducting material formed to provide a plurality of radially extending fins encircling said flange and seated in the recess in said flange in face-to-face relationship therewith, said fins at the outer ends thereof being formed with indented portions across a portion of their width, and a band encircling and connected to the outer periphery of said corrugated strip and seated in the indented portions of said fins.

5. In combination, an annular brake drum having a substantially axially extending peripheral flange with a circumferentially extending recess in the outer peripheral surface thereof, an annular corrugated strip of heat conducting material formed to provide a plurality of radially extending fins encircling said flange and seated in the recess in said flange in face-to-face relationship therewith, said fins at the outer ends thereof being formed with indented portions across a portion of their width, and a band encircling and connected to the outer periphery of said corrugated strip and seated in the indented portions of said fins, said band being connected to certain of said fins.

References Cited in the file of this patent

UNITED STATES PATENTS

| | | |
|---|---|---|
| 1,792,823 | Day | Feb. 17, 1931 |
| 1,846,257 | Huck | Feb. 23, 1932 |
| 1,928,079 | Taylor | Sept. 26, 1933 |
| 1,935,393 | Dodge | Nov. 14, 1933 |
| 2,349,658 | Horn | May 23, 1944 |
| 2,425,116 | Musselman | Aug. 5, 1947 |
| 2,489,522 | Chase | Nov. 29, 1949 |